US012632402B2

(12) United States Patent
Yu et al.

(10) Patent No.: US 12,632,402 B2
(45) Date of Patent: May 19, 2026

(54) DEVICE CAPABLE OF DIRECTLY DIVERTING DATA THROUGH UART PORT AND USB TO UART CONVERTER HAVING THE SAME

(71) Applicant: PROLIFIC TECHNOLOGY INC., Taipei City (TW)

(72) Inventors: Tien-Wei Yu, Taipei City (TW); Chun-Shiu Chen, Taipei City (TW)

(73) Assignee: PROLIFIC TECHNOLOGY INC., Taipei City (TW)

( * ) Notice: Subject to any disclaimer, the term of this patent is extended or adjusted under 35 U.S.C. 154(b) by 43 days.

(21) Appl. No.: 18/672,182

(22) Filed: May 23, 2024

(65) Prior Publication Data

US 2025/0028666 A1    Jan. 23, 2025

(30) Foreign Application Priority Data

Jul. 19, 2023    (TW) ................................. 112126834

(51) Int. Cl.
*G06F 13/38*        (2006.01)
*G06F 13/40*        (2006.01)

(52) U.S. Cl.
CPC ........ *G06F 13/382* (2013.01); *G06F 13/4068* (2013.01)

(58) Field of Classification Search
CPC .................................................. H04L 43/0852
See application file for complete search history.

(56) References Cited

U.S. PATENT DOCUMENTS 7,523,243 B2 *    4/2009    Bohm ................... G06F 13/385
                                                          710/110
9,710,411 B2 *    7/2017    Maung ................. G06F 13/385

FOREIGN PATENT DOCUMENTS

CN          101101567          6/2010

* cited by examiner

*Primary Examiner* — Henry Tsai
*Assistant Examiner* — Juanito C Borromeo

(57)                ABSTRACT

A device capable of directly diverting data through UART port is disclosed. The device can be made to be an integrated circuit (IC) chip, so as to be disposed on a circuit board with a USB connector and three UART connectors, thereby forming a USB to UART converter. When using the USB to UART converter, the USB connector is connected to a host computer, and one UART connector is connected to an electronic device. As such, the device provides the host computer with one virtual COM port, such that the host computer is able to conduct a data transmission with the electronic device through the virtual COM port. Moreover, during the data transmission, a data monitoring electronic device is able to hear the transmitted data by way of diverting the transmitted data through the other two UART connectors.

16 Claims, 11 Drawing Sheets

DEVICE CAPABLE OF DIRECTLY DIVERTING DATA THROUGH UART PORT AND USB TO UART CONVERTER HAVING THE SAME

BACKGROUND OF THE INVENTION

1. Field of the Invention

The present invention relates to the technology field of USB to UART conversion, and more particularly to a device capable of directly diverting data through UART port and a USB to UART converter using the device.

2. Description of the Prior Art

Universal asynchronous receiver/transmitter (UART) interface, e.g., RS232 connector, RS422 connector or RS485 connector, is broadly used in the early industrial control because of using simple transmission protocol. In addition, the early used personal computer is certainly equipped with RS232 connector for communicating with a modulator-demodulator. However, since possessing the characteristics of "plug and play" and high data transmission rate, universal serial bus (USB) connector has now become the main interface of a host electronic device (e.g., desktop computer and laptop computer), such that the host electronic device can transmit data to or receive data from an external electronic device through the USB connector.

However, it is experienced that short-distance communication USB interface is not suitable for application in the industrial control needing long distance data transmission. Even though Ethernet interface or wireless network interface are both able to conduct long distance data transmission instead of the USB interface, they both have the principal shortcoming of expensive price. For above reasons, an USB to UART converter is developed by USB device manufactures, and the USB to UART converter is also called USB-UART bridge. FIG. 1 and FIG. 2 illustrate a first and a second stereo diagram of a conventional USB to UART converter, respectively. As FIG. 1 and FIG. 2 show, the conventional USB to UART converter 1a comprises: a USB interface 11a for being electrically connected to a host computer 2a, a UART interface 12a and a bridge chip 10a, in which the UART interface 12a is a RS232 connector as shown in FIG. 2. Nowadays, famous commercial bridge chips include chip FTDI-232 and chip PL-2303 they are developed by Future Technology Devices International (FTDI) Ltd. and Prolific Technology Inc.

In some industrial control applications, for ensuring data accuracy, data monitoring is needed to be conducted for the data in transmission. Accordingly, China patent No. CN101101567B discloses a monitoring system having two serial communication interfaces (ports) as shown in FIG. 3, and the monitoring system 1b comprises: a first USB-RS232 converter 11b, a second USB-RS232 converter 12b, a USB hub chip 13b, and a host computer 10b. When making a first electronic device 2b be able to transmit data to and/or receive data from a second electronic device 3b, a data transmitting (Tx) terminal of a first RS232 interface 21b of the first electronic device 2b is coupled to a data receiving (Rx) terminal of a second RS232 interface 31b of the second electronic device 3b, and a data receiving terminal of the first RS232 interface 21b is coupled to a data transmitting terminal of the second RS232.

As FIG. 3 shows, the first USB-RS232 converter 11b is coupled to a first data transmission path formed between the Tx terminal of the first RS232 interface 21b and the Rx terminal of the second RS232 interface 31b, and the second USB-RS232 converter 12b is coupled to a second data transmission path formed between the Rx terminal of the first RS232 interface 21b and the Tx terminal of the second RS232 interface 31b. By such arrangements, the first USB-RS232 converter 11b receives a first serial data from the first data transmission path, and then converts the first serial data to a first USB data, thereby transmitting the first USB data to the host computer 10b. On the other hand, the second USB-RS232 converter 12b receives a second serial data from the second data transmission path, and then converts the second serial data to a second USB data, thereby transmitting the second USB data to the host computer 10b.

Therefore, the monitoring system 1b disclosed by China patent No. CN101101567B is indeed able to monitor the transmission data between the first electronic device 2b and the second electronic device 3b. In spite of the foregoing fact, practical experiences still reveal that the monitoring system 1b has the principal shortcoming of: in case of the Baud rate of the first serial data transmitted in the first data transmission path being unknown, given values of the first USB data converted from the first serial data may be not correct or not inconsistent.

According to above descriptions, it is understood that there is still room for improvement in the conventional monitoring system having two serial communication interfaces. In view of this fact, inventors of the present application have made great efforts to make inventive research and eventually provided a device capable of directly diverting data through UART port and a USB to UART converter using the device.

SUMMARY OF THE INVENTION

The primary objective of the present invention is to disclose a device capable of directly diverting data through UART port. The device can be presented by a form of integrated circuit (IC) chip, and is then disposed on a circuit board with a USB connector, a first UART connector, a second UART connector, and a third UART connector, thereby forming a USB to UART converter. When using the USB to UART converter, the USB connector is connected to a host electronic device, the first UART connector is connected to an electronic device, and the second UART connector or the third UART connector is connected to a data monitoring electronic device. As such, the device provides the host electronic device with one virtual COM port, such that the host electronic device is able to conduct a data transmission with the electronic device through the virtual COM port. Moreover, during the data transmission, the data monitoring electronic device is able to hear the transmitted data by way of diverting the transmitted data through the second UART connector or the third UART connector.

Most importantly, the device of the present invention makes the host electronic device conduct a data transmission with the electronic device by a first Baud rate, and makes the data monitoring electronic device hear the transmitted data via the second UART connector or the third UART connector by a second Baud rate. In other words, the device of the present invention allows the data monitoring electronic device to receive data from the second UART connector or the third UART connector by a specific and changeable Baud rate.

In addition, in case of the host electronic device utilizing the virtual COM port to transmit a first data to or receive a second data from the electronic device, the data monitoring electronic device is able to incorporate an additional data into the first data or the second data through the second UART connector or the third UART connector.

For achieving the primary objective mentioned above, the present invention provides an embodiment of the device capable of directly diverting data through UART port, comprising:

a USB unit, being used for establishing an electrical connection with a USB interface, so as to be in communication with a host electronic device through the USB interface;

a first UART controller, being used for establishing an electrical connection with a first UART interface, so as to be in communication with an electronic device through the first UART interface;

a second UART controller, being used for establishing an electrical connection with a second UART interface, so as to be in communication with a data monitoring electronic device through the second UART interface;

a third UART controller, being used for establishing an electrical connection with a third UART interface, so as to be in communication with the data monitoring electronic device through the third UART interface;

a control endpoint (EP0), being coupled to the USB unit;

an interface unit, being coupled to the USB unit;

a data buffer unit, being coupled to the interface unit;

a FIFO unit, being coupled to the data buffer unit, and having a control buffer coupled to the first UART controller, the second UART controller and the third UART controller; and a data diverting unit, being coupled to the FIFO unit, the first UART controller, the second UART controller, and the third UART controller;

wherein in case of the electronic device transmitting a first serial data to the first UART controller through the first UART interface, the first UART controller receiving the first serial data by a first Baud rate, and then the data diverting unit transmits the first serial data to the third UART controller and the FIFO unit, such that the USB unit converts the first serial data to a first USB data after receiving the first serial data through the data buffer unit and the interface unit, thereby transmitting the first USB data to the host electronic device;

wherein after the host electronic device transmits a second USB data to the USB interface, the second USB data being subsequently transmitted to the FIFO unit via the interface unit and the data buffer unit, and then the data diverting unit transmits the second USB data to the first UART controller and the second UART controller after receiving the second USB data from the FIFO unit;

wherein the first UART controller converts the second USB data to a second serial data, so as to transmit the second serial data to the electronic device by said first Baud rate.

In one embodiment, during the electronic device transmitting the first serial data to the host electronic device via said device, the third UART controller transmits the first serial data to the data monitoring electronic device by a second Baud rate that is different from or equal to the first Baud rate. Moreover, during the electronic device transmitting the first serial data to the host electronic device via said device, the data monitoring electronic device is able to transmit a serial data to the data diverting unit through the third UART controller, such that the data diverting unit incorporates the serial data into the first serial data.

In one embodiment, after receiving the second USB data, the second UART controller transmits a serial data converted from the second USB data to the data monitoring electronic device by a third Baud rate, and the third Baud rate is different from or equal to the first Baud rate. Moreover, during the host electronic device transmitting the second USB data to the electronic device via said device, the data monitoring electronic device is able to transmit a USB data to the data diverting unit through the second UART controller, such that the data diverting unit incorporates the USB data into the second USB data.

In one embodiment, said device is presented by a form of integrated circuit (IC) chip, complex programmable logic device (CPLD) chip or field programmable gate array (FPGA) chip.

In one embodiment, the USB interface comprises a first USB connector, the first UART interface comprises a first UART connector, the second UART interface comprises a second UART connector, and the third UART interface comprises a third UART connector.

In one embodiment, the first UART connector, the second UART connector, and the third UART connector are all one type of electrical connector selected from a group consisting of RS232 connector, RS422 connector and RS485 connector.

In one embodiment, the USB unit comprises:

a USB physical layer (PHY) unit, being coupled to the USB interface; and a USB serial interface engine (SIE) unit, being coupled to the USB PHY unit, the control endpoint (EP0) and the interface unit.

In one embodiment, the interface unit comprises:

a first endpoint, being coupled to the SIE unit and the data buffer unit;

a second endpoint, being coupled to the SIE unit and the data buffer unit; and a third endpoint, being coupled to the SIE unit and the data buffer unit.

In one embodiment, the data buffer unit comprises:

a first buffer (FIFO IN), being coupled to the first endpoint and the FIFO unit;

a second buffer (FIFO OUT), being coupled to the second endpoint and the FIFO unit; and a third buffer (FIFO IN), being coupled to the third endpoint and the FIFO unit.

In a practicable embodiment, said device further comprises:

a memory, being coupled the control buffer; and a GPIO unit, being coupled the control buffer, and comprising at least one GPIO pin.

In one embodiment, the FIFO unit comprises:

a first FIFO (Interrupt FIFO), being coupled to the data diverting unit and the first buffer (FIFO IN);

a second FIFO (Bulk OUT FIFO), being coupled to the data diverting unit and the second buffer (FIFO OUT);

a third FIFO (Bulk IN FIFO), being coupled to the data diverting unit and the third buffer (FIFO IN); and said control buffer, being coupled to the first UART controller, the second UART controller, the third UART controller, the control endpoint (EP0), the memory and the GPIO unit.

In one embodiment, the data diverting unit comprises:

a first multiplexer, having a first input terminal, a second terminal and an output terminal;

a second multiplexer, also having a first input terminal, a second terminal and an output terminal;

a fourth buffer (FIFO TX1), being coupled between the first UART controller and the output terminal of the first multiplexer;

a fifth buffer (FIFO RX1), being coupled between the first UART controller and the first input terminal of the second multiplexer;

a sixth buffer (FIFO TX2), being coupled to the second UART controller;

a seventh buffer (FIFO RX2), being coupled between the second UART controller and the first input terminal of the first multiplexer;

an eighth buffer (FIFO TX3), being coupled to the third UART controller, and being also coupled to an interconnection node between the fifth buffer (FIFO RX1) and the first input terminal of the second multiplexer;

a ninth buffer (FIFO RX3), being coupled between the third UART controller and the second input terminal of the second multiplexer;

a tenth buffer (FIFO TX4), being coupled to the second input terminal of the first multiplexer, and being also coupled to the second FIFO (Bulk OUT FIFO); and an eleventh buffer (FIFO RX4), being coupled to the output terminal of the second multiplexer, and being also coupled to the third FIFO (Bulk IN FIFO);

wherein the sixth buffer (FIFO TX2) is also coupled to an interconnection node between the tenth buffer (FIFO TX4) and the second input terminal of the first multiplexer.

In one practicable embodiment, the host electronic device and the data monitoring electronic device are both one type of electronic device selected from a group consisting of laptop computer, desktop computer, all-in-one computer, industrial computer, and server computer.

Moreover, the present invention also provides an embodiment of a USB to UART converter, which comprises a printed circuit board, a USB connector, a first UART connector, a second UART connector, a third UART connector, and a bridge device, wherein the USB connector, the first UART connector, the second UART connector, the third UART connector, and the bridge device are all disposed on the printed circuit board, and the bridge device being electrically connected to the USB connector, the first UART connector, the second UART connector, and the third UART connector; characterized in that the bridge device comprises:

a USB unit, being coupled to the USB connector, so as to be in communication with a host electronic device through the USB connector;

a first UART controller, being coupled to the first UART connector, so as to be in communication with an electronic device through the first UART connector;

a second UART controller, being coupled to the second UART connector, so as to be in communication with a data monitoring electronic device through the second UART connector;

a third UART controller, being coupled to the third UART connector, so as to be in communication with the data monitoring electronic device through the third UART connector;

a control endpoint (EP0), being coupled to the USB unit;

an interface unit, being coupled to the USB unit;

a data buffer unit, being coupled to the interface unit;

a FIFO unit, being coupled to the data buffer unit, and having a control buffer coupled to the first UART controller, the second UART controller and the third UART controller; and a data diverting unit, being coupled to the FIFO unit, the first UART controller, the second UART controller, and the third UART controller;

wherein in case of the electronic device transmitting a first serial data to the first UART controller through the first UART connector, the first UART controller receiving the first serial data by a first Baud rate, and then the data diverting unit transmits the first serial data to the third UART controller and the FIFO unit, such that the USB unit converts the first serial data to a first USB data after receiving the first serial data through the data buffer unit and the interface unit, thereby transmitting the first USB data to the host electronic device;

wherein after the host electronic device transmits a second USB data to the USB unit through the USB connector, the second USB data being subsequently transmitted to the FIFO unit via the interface unit and the data buffer unit, and then the data diverting unit transmits the second USB data to the first UART controller and the second UART controller after receiving the second USB data from the FIFO unit;

wherein the first UART controller converts the second USB data to a second serial data, so as to transmit the second serial data to the electronic device by said first Baud rate.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a device capable of directly diverting data through UART port and a USB to UART converter according to the present invention, embodiments of the present invention will be described in detail with reference to the attached drawings hereinafter.

Figure 1:
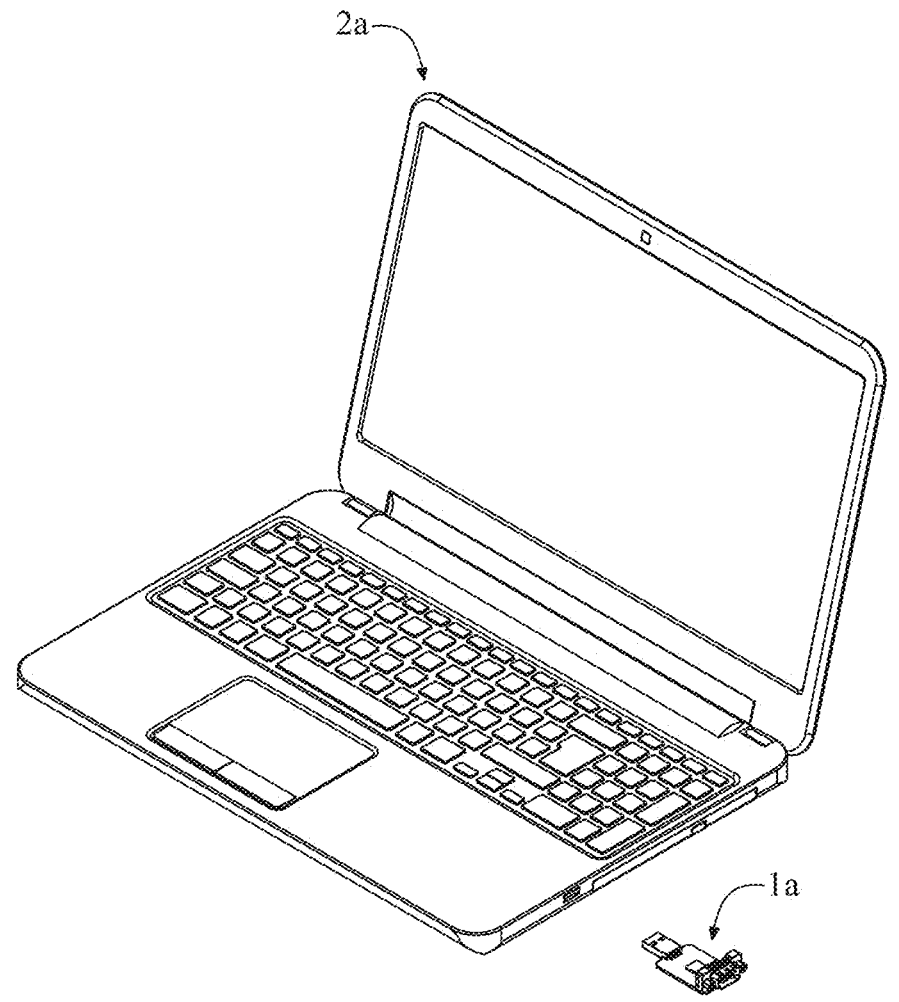
FIG. 1 shows a first stereo diagram of a conventional USB to UART converter.
Figure 2:
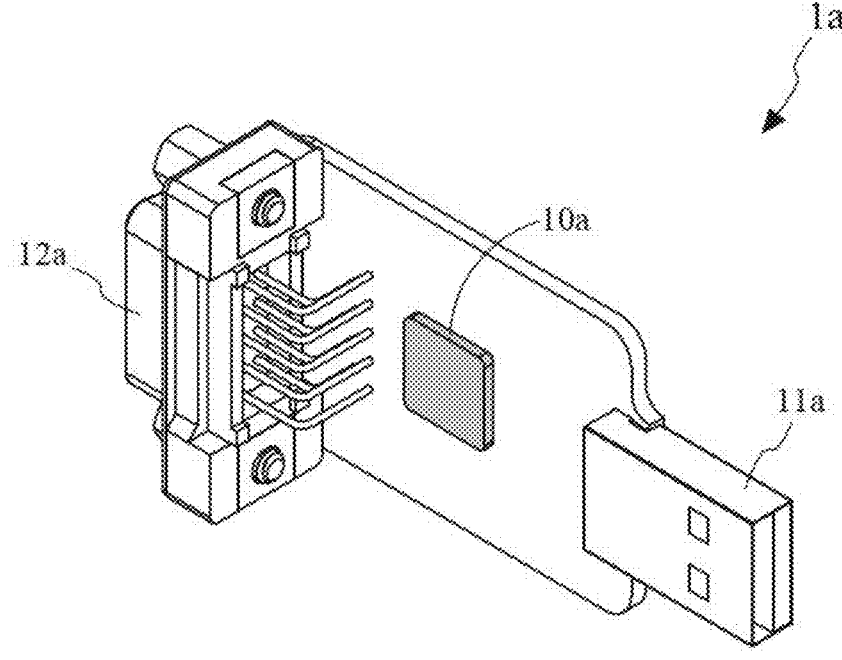
FIG. 2 shows a second stereo diagram of the conventional USB to UART converter.
Figure 3:
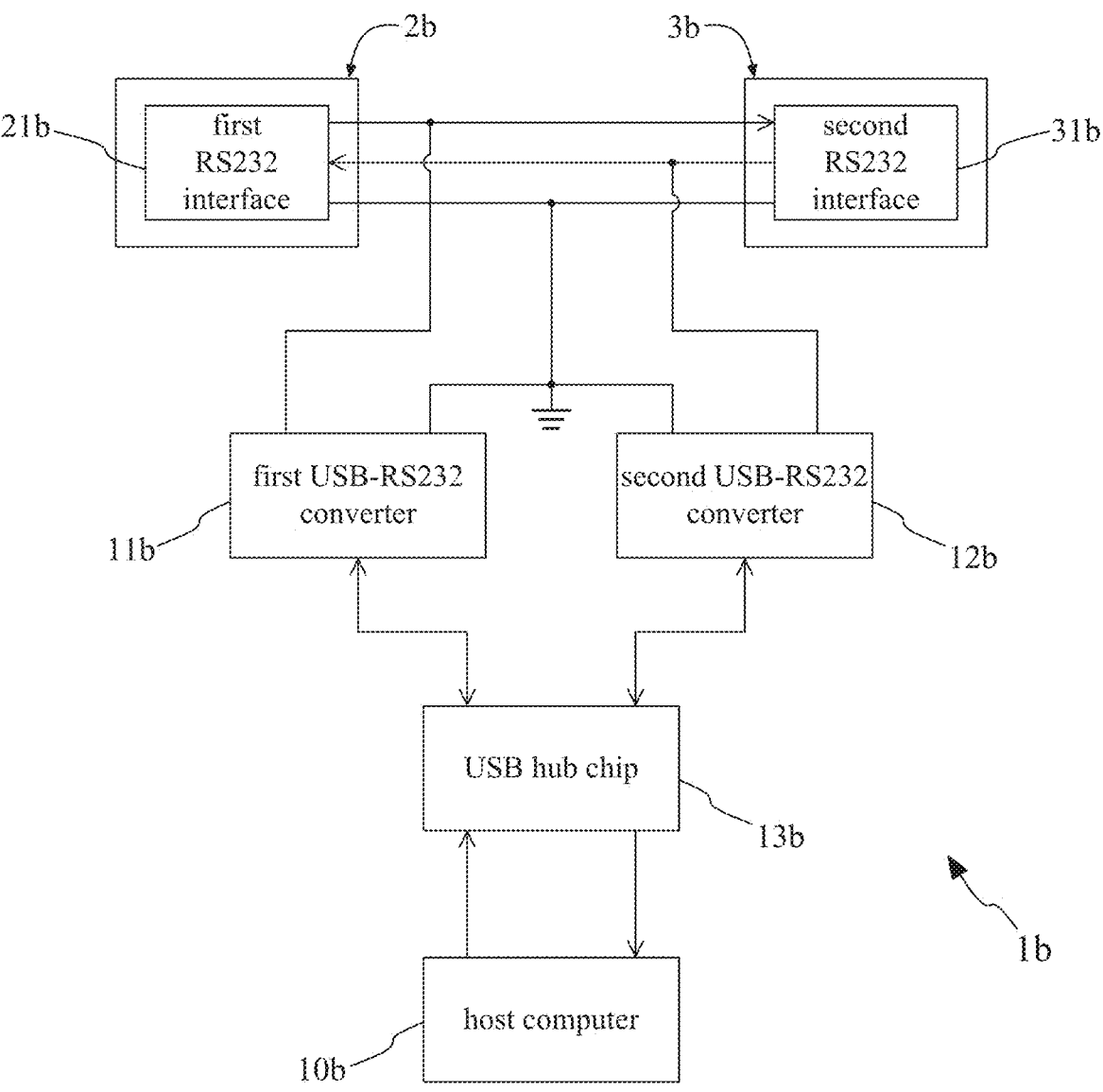
FIG. 3 shows a block diagram of a monitoring system having two serial communication interfaces (ports)
Figure 4:
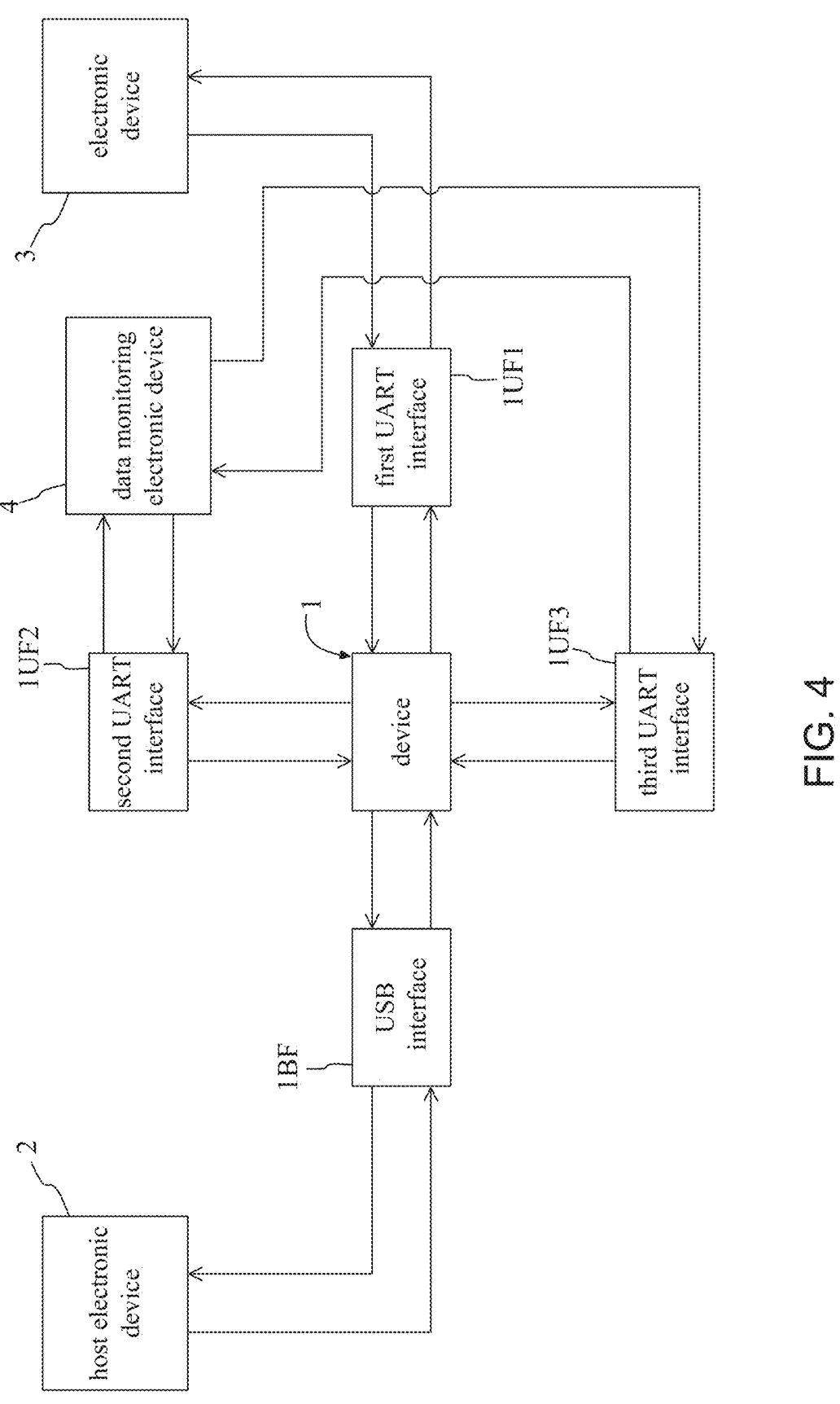
FIG. 4 shows a block diagram of a device capable of directly diverting data through UART port according to the present invention.

With reference to FIG. 4, which illustrates a block diagram of a device capable of directly diverting data through UART port according to the present invention. As FIG. 4 shows, the present invention provides a device 1 capable of directly diverting data through UART port, which can be electrically connected to a USB interface 1BF, a first UART interface 1UF1, a second UART interface 1UF2, and a third UART interface 1UF3, such that the device 1 communicates with a host electronic device 2 through the USB interface 1BF, communicates with an electronic device 3 via the first UART interface 1UF1, and communicates with a data monitoring electronic device 4 via the second UART interface 1UF2 and/or the third UART interface 1UF3.

Figure 5:
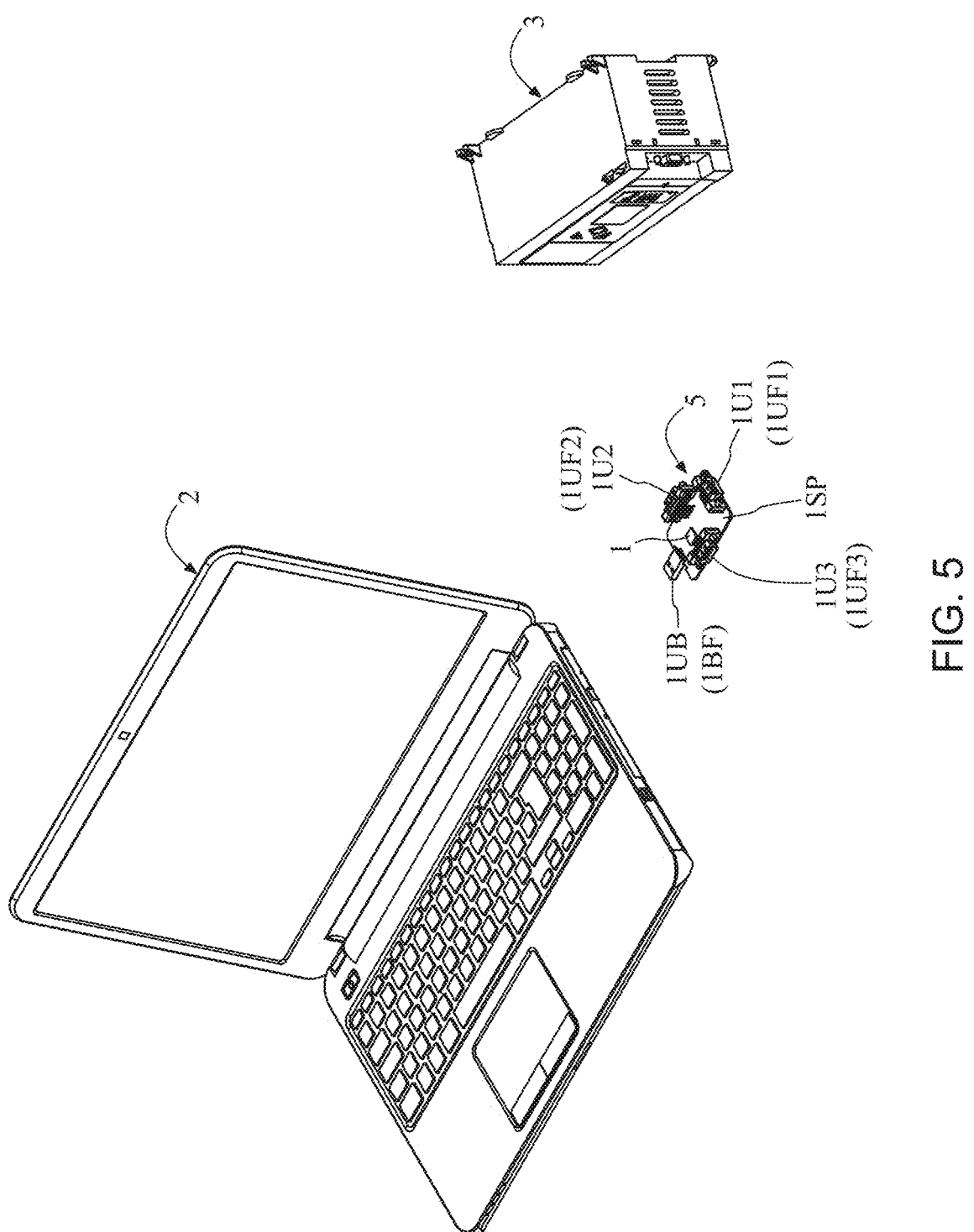
FIG. 5 shows a stereo diagram of a host electronic device, an electronic device, and the device capable of directly diverting data through UART port according to the present invention.

FIG. 5 illustrates a stereo diagram of the host electronic device 2, the electronic device 2, and the device 1 as shown in FIG. 4. In one embodiment, the USB interface 1BF comprises a first USB connector 1UB, the first UART interface 1UF1 comprises a first UART connector 1U1, the second UART interface 1UF2 comprises a second UART connector 1U2, and the third UART interface 1UF3 comprises a third UART connector 1U3. Therefore, as FIG. 5 shows, said device 1 is presented by a form of integrated circuit (IC) chip, and is disposed on a printed circuit board 1SP with the USB connector 1UB, the first UART connector 1U1, the second UART connector 1U2, and the third UART connector 1U3, thereby forming a USB to UART converter 5.

Figure 6:
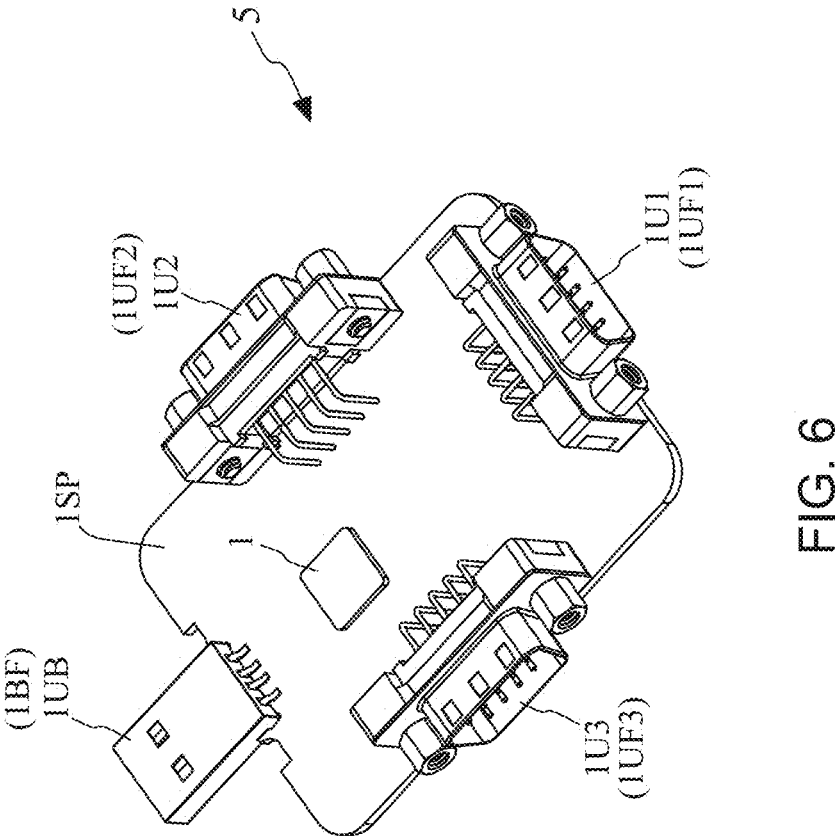
FIG. 6 shows a stereo diagram of a USB to UART converter as shown in FIG. 5.

FIG. 6 illustrates a stereo diagram of the USB to UART converter 5 as shown in FIG. 5. In other practicable embodiments, the bridge device 1 can also be presented by a form of complex programmable logic device (CPLD) chip or field programmable gate array (FPGA) chip, wherein the CPLD chip or the FPGF chip is embedded with HDL (hardware description language) codes for establishing the circuitry of the device 1. Moreover, the first UART connector 1U1, the second UART connector 1U2, and the third UART connector 1U3 all can be, but are not limited to, a RS232 connector, a RS422 connector or a RS485 connector. On the other hand, the host electronic device 2 and the data monitoring electronic device 4 all can be, but are not limited to, a laptop computer, a desktop computer, an all-in-one computer, an industrial computer, and a server computer.

Figure 7:
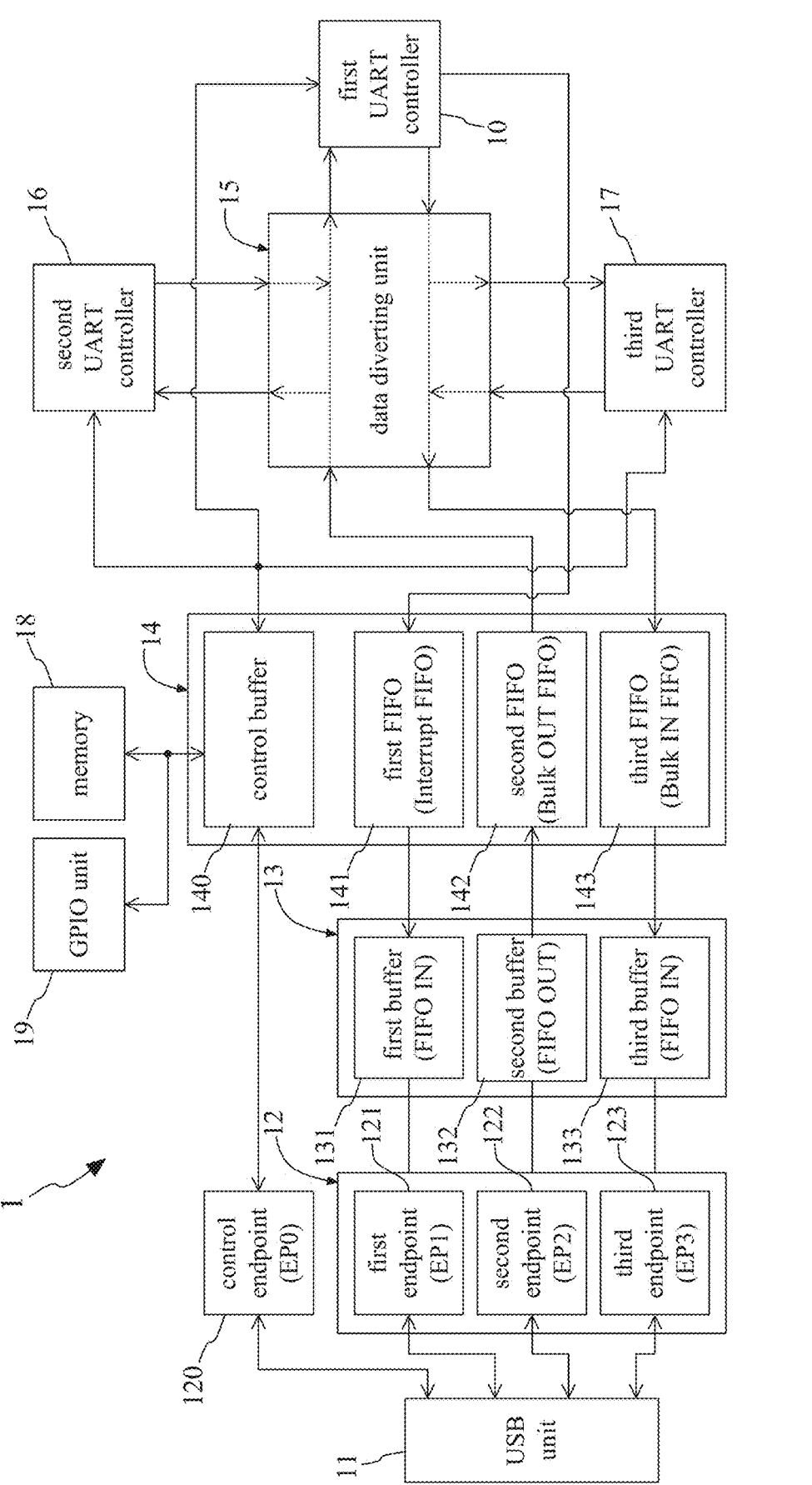
FIG. 7 shows a block diagram of the USB to UART converter as shown in FIG. 5.

FIG. 7 illustrates a block diagram of the USB to UART converter 5 as shown in FIG. 5. As FIG. 5, FIG. 6 and FIG. 7 show, the device 1 principally comprises: a first UART controller 10, a second UART controller 16, a third UART controller 17, a control endpoint (EP0) 120, an interface unit 12, a data buffer unit 13, a FIFO unit 14, and a data diverting unit 15. According to the present invention, the USB unit 11 is used for establishing an electrical connection with the USB interface 1BF (i.e., the USB connector 1UB), so as to be in communication with the host electronic device 2 through the USB interface 1BF. On the other hand, the first UART controller 10 is used for establishing an electrical connection with the first UART interface 1UF1 (i.e., the first UART connector 1U1), so as to be in communication with the electronic device 3 through the first UART interface 1UF1. Moreover, the second UART controller 16 is used for establishing an electrical connection with the second UART interface 1UF2 (i.e., the second UART connector 1U2), so as to be in communication with the data monitoring electronic device 4 through the second UART interface 1UF2. As explained in more detail below, the third UART controller 17 is used for establishing an electrical connection with the third UART interface 1UF3 (i.e., the third UART connector 1U3), so as to be in communication with the data monitoring electronic device 4 through the third UART interface 1UF3.

FIG. 5, FIG. 6 and FIG. 7 also depict that the USB unit 11 is coupled to the control endpoint (EP0) 120 and the interface unit 12. Electronic engineers skilled in design and manufacture of USB devices certainly know that, a regular USB device must be provided with at least three standard endpoints therein, i.e., EP0, EP_IN and EP_OUT, in which EP0 is responsible for enumerating configuration descriptors and configurating control transfer (e.g., read transaction or write transaction), EP_IN (i.e., EP1) is adopted for transmitting a data from a device end (e.g., the electronic device 3) to a host end (e.g., the host electronic device 2), and EP_OUT (i.e., EP2) is used for transmitting a data from the host end to the device end. Moreover, in the regular USB device, EP1 and EP2 can also be defined as EP_IN and EP_OUT through endpoint declaration. Therefore, as FIG. 6 show, in the device 1 the control endpoint (EP0) 120 is responsible for enumerating configuration descriptors and configurating control transfer (e.g., read transaction or write transaction), and the interface unit 12 consists of a first endpoint 121, a second endpoint 122, and a third endpoint 123 for acting as EP1 (EP_OUT), EP2 (EP_IN) and EP3 (EP_OUT).

As described in more detail below, the data buffer unit 13 is coupled to the interface unit 12, and the FIFO unit 14 is coupled to the data buffer unit 13, and has a control buffer 140 coupled to the first UART controller 10, the second UART controller 16 and the third UART controller 17. As FIG. 5 and FIG. 7 show, the data diverting unit 15 is coupled to the FIFO unit 14, the first UART controller 10, the second UART controller 16, and the third UART controller 17. By such arrangements, when the electronic device 3 transmits a first serial data to the first UART controller 10 through the first UART interface 1UF1, the first UART controller 10 receives the first serial data by a first Baud rate, and then the data diverting unit 15 transmits the first serial data to the third UART controller 17 and the FIFO unit 14, such that the USB unit 11 converts the first serial data to a first USB data after receiving the first serial data through the data buffer unit 13 and the interface unit 12, thereby transmitting the first USB data to the host electronic device 2.

It needs to further explain that, after receiving the first serial data, the third UART controller 17 transmits the first serial data to the data monitoring electronic device 4 by a second Baud rate that is different from or equal to the first Baud rate. In other words, the device 1 of the present invention makes the host electronic device 2 conduct a data transmission with the electronic device 3 by a first Baud rate, and allows the data monitoring electronic device 4 to hear the transmitted data via the third UART controller 17 by a specific and changeable Baud rate. Moreover, during the electronic device 3 transmitting the first serial data to the host electronic device 2 via said device 1, the data monitoring electronic device 4 is able to transmit a serial data to the data diverting unit 15 through the third UART controller 17, such that the data diverting unit 15 incorporates the serial data into the first serial data.

As FIG. 5 and FIG. 7 shows, after the host electronic device 2 transmits a second USB data to the USB unit 11 through the interface 1BF, the second USB data is subsequently transmitted to the FIFO unit 14 via the interface unit 12 and the data buffer unit 13, and then the data diverting unit 15 transmits the second USB data to the first UART controller 10 and the second UART controller 16 after receiving the second USB data from the FIFO unit 14. As a result, the first UART controller 10 converts the second USB data to a second serial data, so as to transmit the second serial data to the electronic device 3 by said first Baud rate.

It needs to further explain that, after receiving the second USB data, the second UART controller 16 transmits a serial data converted from the second USB data to the data monitoring electronic device 4 by a third Baud rate that is different from or equal to the first Baud rate. In other words, the device 1 of the present invention makes the host electronic device 2 conduct a data transmission with the electronic device 3 by a first Baud rate, and allows the data monitoring electronic device 4 to hear the transmitted data via the second UART controller 16 by a specific and changeable Baud rate. Moreover, during the host electronic device 2 transmitting the second USB data to the electronic device 3 via said device, the data monitoring electronic device 4 is able to transmit a USB data to the data diverting unit 15 through the second UART controller 16, such that the data diverting unit 15 incorporates the USB data into the second USB data.

Figure 8:
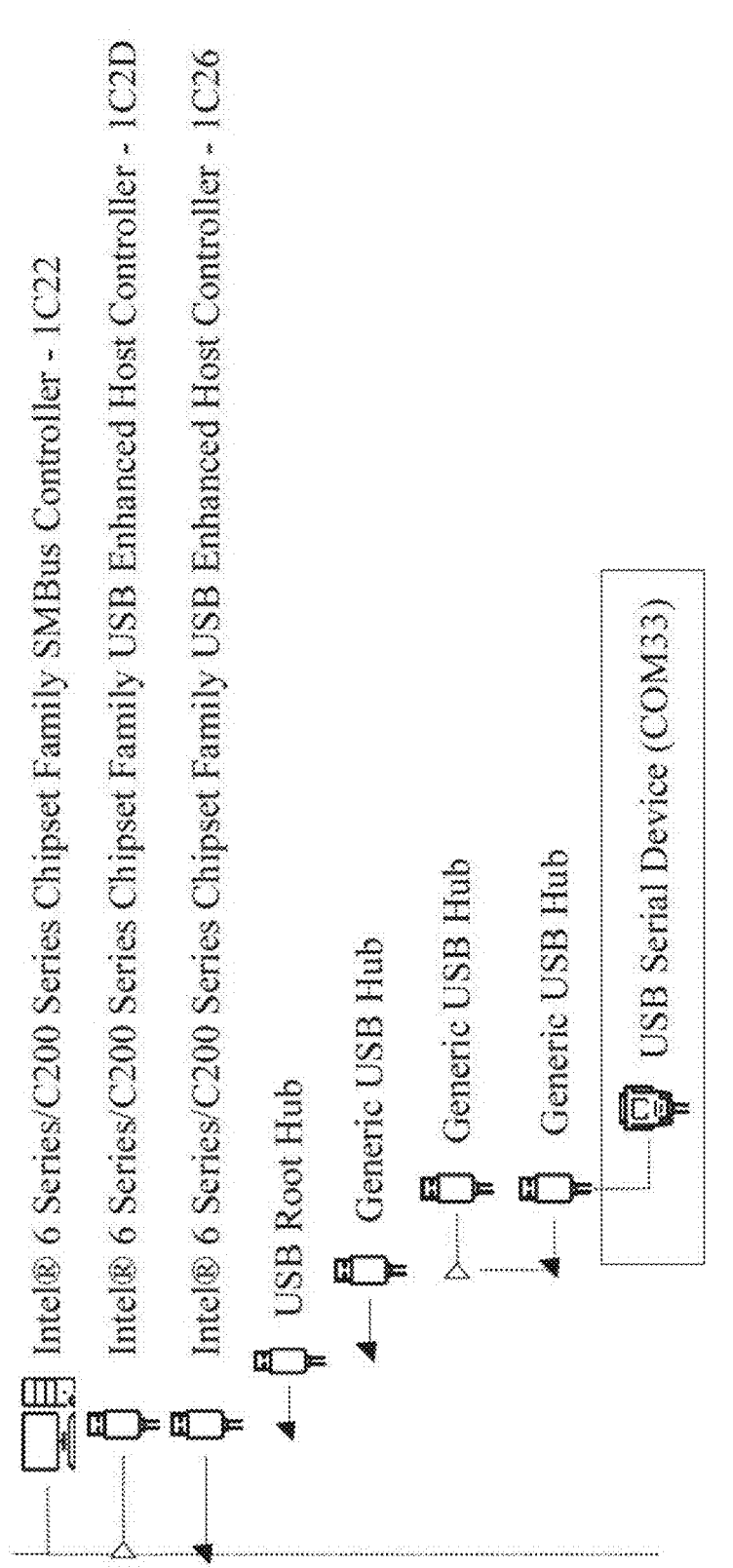
FIG. 8 shows a first image of a device manager of an operating system of the host electronic device.
Figure 9:
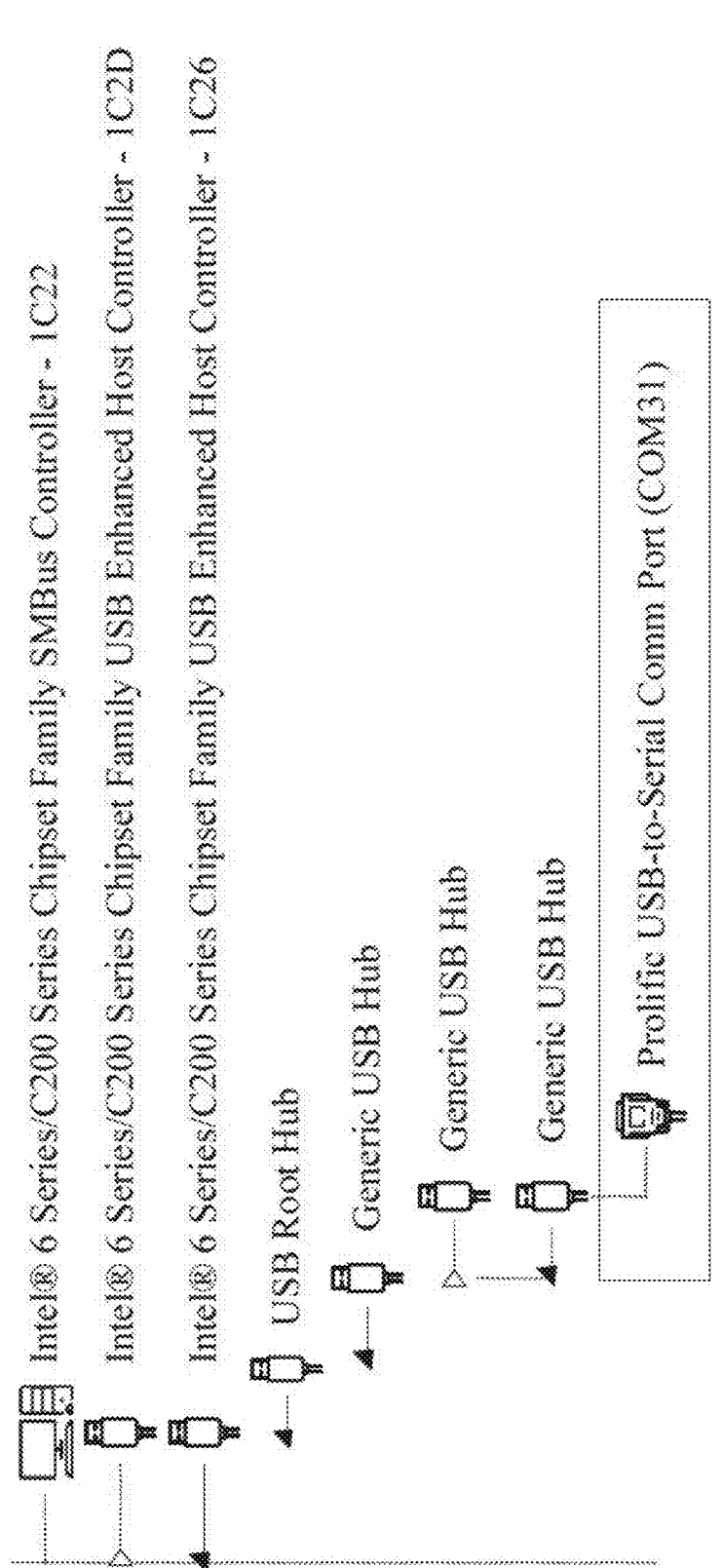
FIG. 9 shows a second image of the device manager of the operating system of the host electronic device.

It is worth further explaining that, standard CDC-ACM driver can be taken as a main driver program stored in the memory 18 of the device 1. As FIG. 8 shows, in case of the main driver program stored in the memory 18 being the standard CDC-ACM driver, device manager of the host electronic device's operating system would detect so as to enumerate one virtual COM port in the device tree after the bridge device 1 is in communication with the host electronic device 2. Therefore, the host electronic device 2 is able to conduct a data transmission with the electronic device 3 through the virtual COM port. In other practicable embodiments, the main driver program stored in the memory 18 can also be made by a programmer or a software engineer. In other words, the main driver program is not the standard CDC-ACM driver. As FIG. 9 shows, in case of the programmer creating a driver program to be stored in the memory of the bridge device 1, device manager of the host electronic device's operating system would still detect so as to enumerate one virtual COM port in the device tree after the bridge device 1 is in communication with the host electronic device 2. It is noted that, in FIG. 8 the virtual COM port has a device name "USB Serial Device", that is a standard USB device name given by the standard CDC-ACM driver. On the contrary, in FIG. 9 the virtual COM port has an engineer-given device name "Prolific USB-to-Serial Comm Port".

Figure 10:
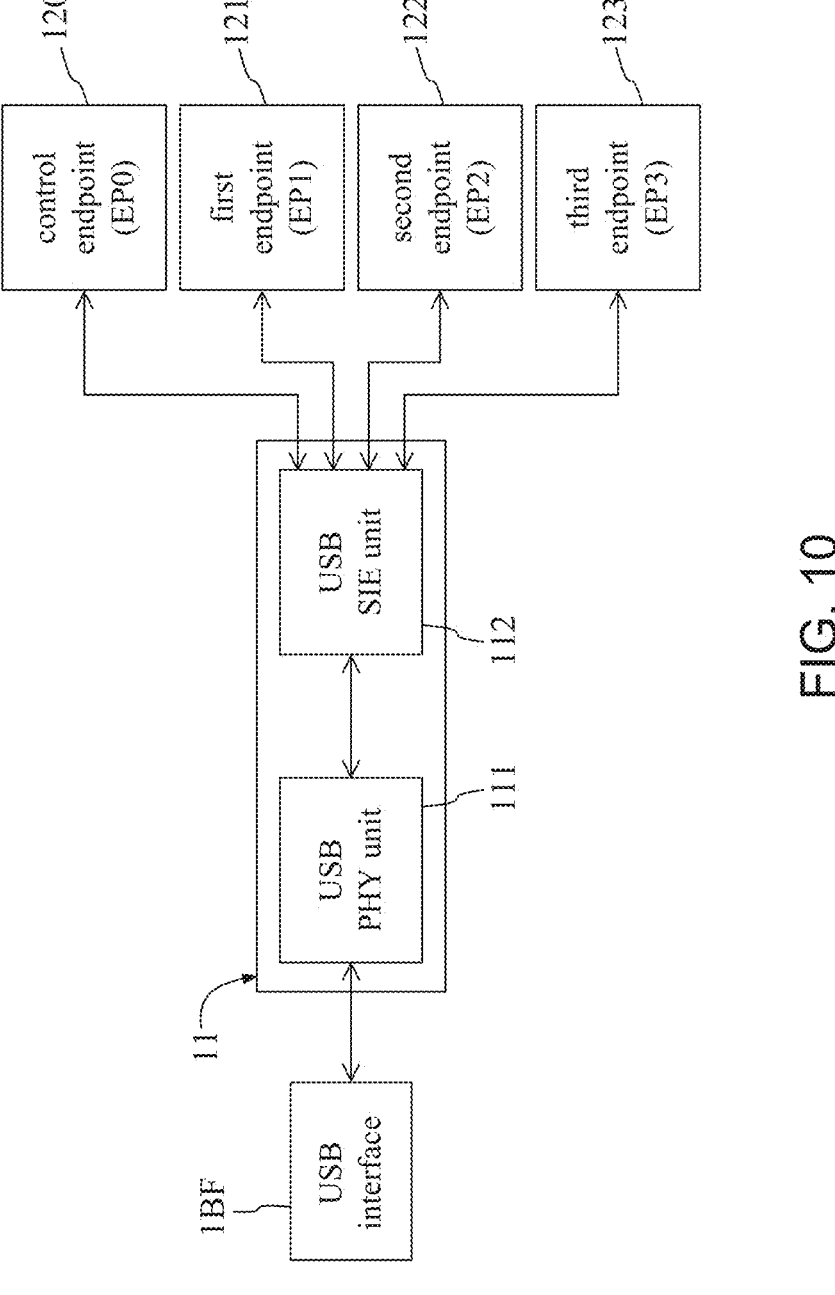
FIG. 10 shows a block diagram of a USB unit as shown in FIG. 7.

As FIG. 7 shows, in the device 1 the memory 18 is coupled the control buffer 140 of the FIFO unit 14. Moreover, the device 1 further comprises a GPIO unit 19, which is coupled the control buffer 140, and comprises at least one GPIO pin. Furthermore, FIG. 10 shows a block diagram of the USB unit 11 as shown in FIG. 7. According to the present invention, the USB unit 11 comprises a USB physical layer (PHY) unit 111, and a USB serial interface engine (SIE) unit 112, in which the PHY unit 111, is coupled to the USB interface 1BF (i.e., the USB connector 1UB), and the SIE unit 112 is coupled to the USB PHY unit 111, the control endpoint (EP0) 120 and the interface unit 12. On the other hand, as FIG. 7 and FIG. 10 show, the interface unit 12 comprises a first endpoint 121, a second endpoint 122 and a third endpoint 123, and the first endpoint 121, the second endpoint 122 and the third endpoint 123 are all coupled to the SIE unit 112 and the data buffer unit 13.

It is worth explaining that, the data buffer unit 13 is designed to consists of a first buffer (FIFO IN) 131, a second buffer (FIFO OUT) 132 and a third buffer (FIFO IN) 133, so as to make the first buffer (FIFO IN) 131, the second buffer (FIFO OUT) 132 and the third buffer (FIFO IN) 133 to be coupled to the first endpoint 121 (EP1=EP_IN), the second endpoint 122 (EP1=EP_OUT) and the third endpoint 123 (EP3=EP_IN), respectively. Moreover, the first buffer 131, the second buffer 132 and the third buffer 133 are all coupled to the FIFO unit 14.

On the other hand, the FIFO unit 14 is designed to consist of said control buffer 140, a first FIFO (Interrupt FIFO) 141, a second FIFO (Bulk OUT FIFO) 142, and a third FIFO (Bulk IN FIFO) 143. As FIG. 7 shows, the first FIFO (Interrupt FIFO) 141 is coupled to the data diverting unit 15 and the first buffer (FIFO IN) 131, the second FIFO (Bulk OUT FIFO) 142 is coupled to the data diverting unit 15 and the second buffer (FIFO OUT) 132, the third FIFO (Bulk IN FIFO) 143 is coupled to the data diverting unit 15 and the third buffer (FIFO IN) 133, and the control buffer 140 is coupled to the first UART controller 10, the second UART controller 16, the third UART controller 17, the control endpoint (EP0) 120, the memory 18 and the GPIO unit 19.

Figure 11:
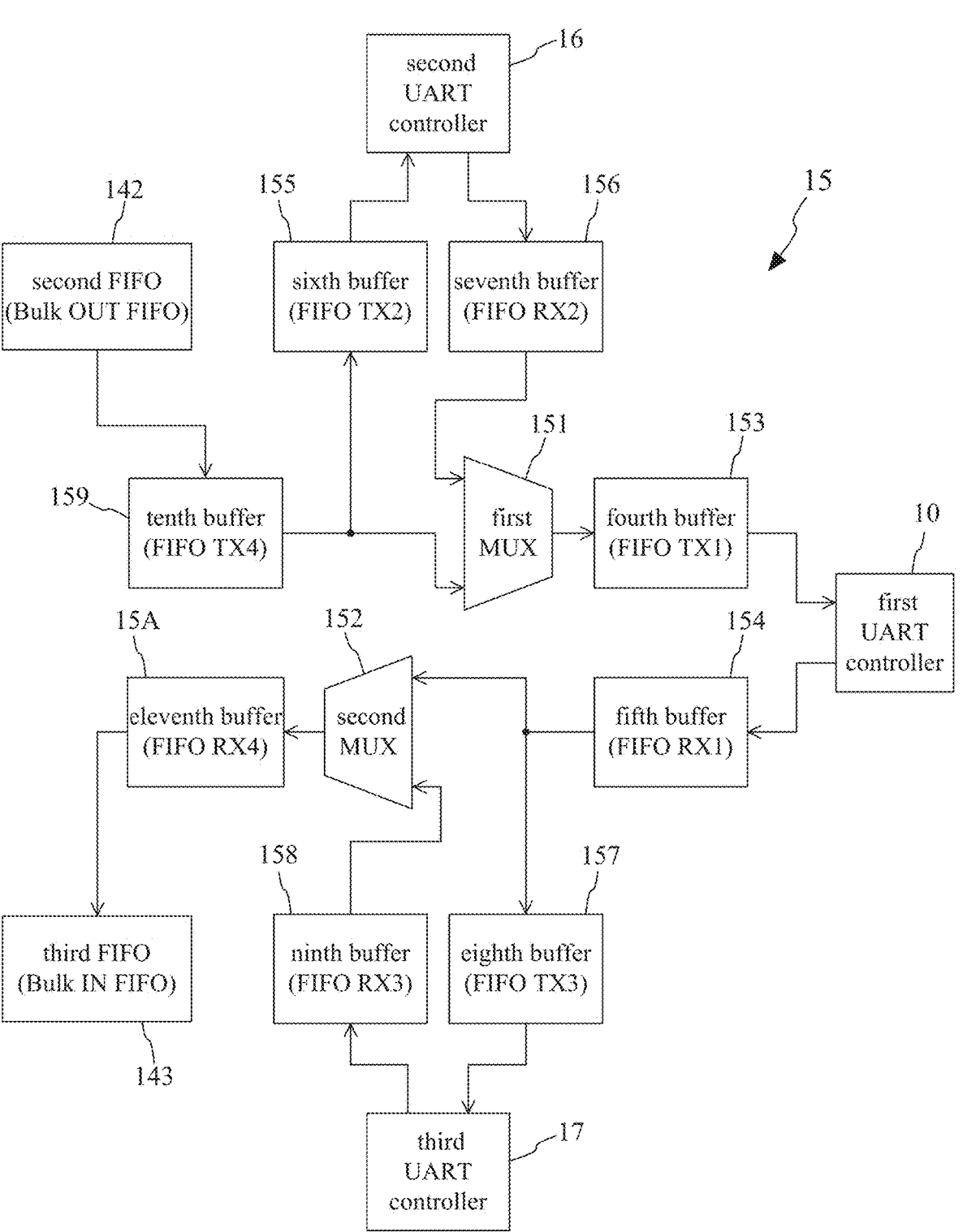
FIG. 11 shows a block diagram of a data diverting unit, a first UART controller, a second UART controller, and a third UART controller as shown in FIG. 7.

FIG. 11 shows a block diagram of the data diverting unit 15, the first UART controller 10, the second UART controller 16, and the third UART controller 17 as shown in FIG. 7. According to the present invention, the data diverting unit 15 comprises a first multiplexer (MUX) 151, a second multiplexer (MUX) 152, a fourth buffer (FIFO TX1) 153, a fifth buffer (FIFO RX1) 154, a sixth buffer (FIFO TX2) 155, a seventh buffer (FIFO RX2) 156, an eighth buffer (FIFO TX3) 157, a ninth buffer (FIFO RX3) 158, a tenth buffer (FIFO TX4) 159, and an eleventh buffer (FIFO RX4) 15A. As FIG. 7 and FIG. 11 show, the first multiplexer 151 and the second multiplexer 152 both have a first input terminal, a second terminal and an output terminal. On the other hand, the fourth buffer (FIFO TX1) 153 is coupled between the first UART controller 10 and the output terminal of the first multiplexer 151, and the fifth buffer (FIFO RX1) 154 is coupled between the first UART controller 10 and the first input terminal of the second multiplexer 152.

As described in more detail below, the sixth buffer (FIFO TX2) 155 is coupled to the second UART controller 16, and the seventh buffer (FIFO RX2) 156 is coupled between the second UART controller 16 and the first input terminal of the first multiplexer 151. On the other hand, the eighth buffer (FIFO TX3) 157 is coupled to the third UART controller 17, and is also coupled to an interconnection node between the fifth buffer (FIFO RX1) 154 and the first input terminal of the second multiplexer 152. Moreover, the ninth buffer (FIFO RX3) 158 is coupled between the third UART controller 17 and the second input terminal of the second multiplexer 152. In addition, FIG. 11 depicts that the tenth buffer (FIFO TX4) 159 is coupled to the second input terminal of the first multiplexer 151, and is also coupled to the second FIFO (Bulk OUT FIFO) 142. FIG. 11 further depicts that the eleventh buffer (FIFO RX4) 15A is coupled to the output terminal of the second multiplexer 152, and is also coupled to the third FIFO (Bulk IN FIFO) 143. Moreover, as FIG. 10 shows, the sixth buffer (FIFO TX2) 155 is also coupled to an interconnection node between the tenth buffer (FIFO TX4) 159 and the second input terminal of the first multiplexer 151.

Electronic engineers skilled in design and manufacture of USB devices certainly know that, a regular USB device is able to conduct four type of transactions, Bulk transaction, control transaction, interrupt transaction, and isochronous transaction. As FIG. 7 show, the control buffer 140, the control endpoint (EP0) and the GPIO unit 19 are used in control transaction, and the first endpoint (EP1) 121, the first buffer (FIFO IN) 131 and the first FIFO (Interrupt FIFO) 141 are used in interrupt transaction. On the other hand, the second endpoint (EP2) 122, the second buffer (FIFO OUT) and the second FIFO (Bulk OUT FIFO) 142 are used in Bulk OUT transaction, and the third endpoint (EP3) 123, the third buffer (FIFO IN) 133 and the third FIFO (Bulk IN FIFO) 143 are used in Bulk IN transaction.

Therefore, through above descriptions, all embodiments and their constituting elements of the device 1 capable of directly diverting data through UART port and the USB to UART converter 5 using the device 1 have been introduced completely and clearly. In summary, the present invention includes the advantages of:

(1) the present invention provides a device 1 capable of directly diverting data through UART port. The device 1 can be presented by a form of integrated circuit (IC) chip, and is then disposed on a circuit board with a USB connector 1UB, a first UART connector 1U1, a second UART connector 1U2, and a third UART connector 1U3, thereby forming a USB to UART converter 5. When using the USB to UART converter 5, the USB connector 1UB is connected to a host electronic device 2, the first UART connector 1U1 is connected to an electronic device 3, and the second UART connector 1U2 and/or the third UART connector 1U3 is connected to a data monitoring electronic device 4. As such, the device 1 provides the host electronic device 2 with one virtual COM port, such that the host electronic device 2 is able to conduct a data transmission with the electronic device 3 through the virtual COM port. Moreover, during the data transmission, the data monitoring electronic device 4 is able to hear the transmitted data by way of diverting the transmitted data through the second UART connector 1U2 or the third UART connector 1U3.

(2) Most importantly, the device 1 of the present invention makes the host electronic device 2 conduct a data transmission with the electronic device 3 by a first Baud rate, and makes the data monitoring electronic device 4 hear the transmitted data via the second UART connector 1U2 or the third UART connector 1U3 by a second Baud rate that is different from or equal to the first Baud rate. In other words, the device 1 of the present invention allows the data monitoring electronic device 4 to receive data from the second UART connector 1U2 or the third UART connector 1U3 by a specific and changeable Baud rate.

(3) In addition, in case of the host electronic device 2 utilizing the virtual COM port to transmit a first data to or receive a second data from the electronic device 3, the data monitoring electronic device 4 is able to incorporate an additional data into the first data or the second data through the second UART connector 1U2 or the third UART connector 1U3.

Therefore, through above descriptions, all embodiments and their constituting elements of the bridge device having data monitoring function and the USB to UART converter proposed by the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:
1. A device capable of directly diverting data through UART port, comprising:

a USB unit, being configured to establish an electrical connection with a USB interface, so as to be in communication with a host electronic device through the USB interface;

a first UART controller, being configured to establish an electrical connection with a first UART interface, so as to be in communication with an electronic device through the first UART interface;

a second UART controller, being configured to establish an electrical connection with a second UART interface, so as to be in communication with a data monitoring electronic device through the second UART interface;

a third UART controller, being configured to establish an electrical connection with a third UART interface, so as to be in communication with the data monitoring electronic device through the third UART interface;

a control endpoint, being coupled to the USB unit;

an interface unit, being coupled to the USB unit;

a data buffer unit, being coupled to the interface unit;

a FIFO unit, being coupled to the data buffer unit, and having a control buffer coupled to the first UART controller, the second UART controller and the third UART controller; and a data diverting unit, being coupled to the FIFO unit, the first UART controller, the second UART controller, and the third UART controller;

wherein in case of the electronic device transmitting a first serial data to the first UART controller through the first UART interface, the first UART controller receiving the first serial data by a first Baud rate, and then the data diverting unit transmits the first serial data to the third UART controller and the FIFO unit, such that the USB unit converts the first serial data to a first USB data after receiving the first serial data through the data buffer unit and the interface unit, thereby transmitting the first USB data to the host electronic device;

wherein after the host electronic device transmits a second USB data to the USB unit through the interface, the second USB data being subsequently transmitted to the FIFO unit via the interface unit and the data buffer unit, and then the data diverting unit transmits the second USB data to the first UART controller and the second UART controller after receiving the second USB data from the FIFO unit;

wherein the first UART controller converts the second USB data to a second serial data, so as to transmit the second serial data to the electronic device by said first Baud rate.

2. The device of claim 1, wherein during the electronic device transmitting the first serial data to the host electronic device via said device, the third UART controller transmitting the first serial data to the data monitoring electronic device by a second Baud rate that may differ from the first Baud rate.

3. The device of claim 2, wherein during the electronic device transmitting the first serial data to the host electronic device via said device, the data monitoring electronic device being configured to transmit a serial data to the data diverting unit through the third UART controller, such that the data diverting unit incorporates the serial data into the first serial data.

4. The device of claim 2, wherein after receiving the second USB data, the second UART controller transmitting a serial data converted from the second USB data to the data monitoring electronic device by a third Baud rate, and the third Baud rate being different from or equal to the first Baud rate.

5. The device of claim 2, wherein during the host electronic device transmitting the second USB data to the electronic device via said device, the data monitoring electronic device being configured to transmit a USB data to the data diverting unit through the second UART controller, such that the data diverting unit incorporates the USB data into the second USB data.

6. The device of claim 1, wherein said device is presented by a form of integrated circuit (IC) chip, complex programmable logic device (CPLD) chip or field programmable gate array (FPGA) chip.

7. The device of claim 1, wherein the USB interface comprises a first USB connector, the first UART interface comprising a first UART connector, the second UART interface comprising a second UART connector, and the third UART interface comprising a third UART connector.

8. The device of claim 7, wherein the first UART connector, the second UART connector, and the third UART connector are all one type of electrical connector selected from a group consisting of RS232 connector, RS422 connector and RS485 connector.

9. The device of claim 8, wherein the USB unit comprises:
a USB physical layer (PHY) unit, being coupled to the USB interface; and
a USB serial interface engine (SIE) unit, being coupled to the USB PHY unit, the control endpoint (EP0) and the interface unit.

10. The device of claim 9, wherein the interface unit comprises:
a first endpoint, being coupled to the SIE unit and the data buffer unit;
a second endpoint, being coupled to the SIE unit and the data buffer unit; and
a third endpoint, being coupled to the SIE unit and the data buffer unit.

11. The device of claim 10, wherein
a first buffer, being coupled to the first endpoint and the FIFO unit;
a second buffer, being coupled to the second endpoint and the FIFO unit; and
a third buffer, being coupled to the third endpoint and the FIFO unit.

12. The device of claim 11, further comprising:
a memory, being coupled to the control buffer; and
a GPIO unit, being coupled to the control buffer, and comprising at least one GPIO pin.

13. The device of claim 11, wherein the FIFO unit comprises:
a first FIFO, being coupled to the data diverting unit and the first buffer;
a second FIFO, being coupled to the data diverting unit and the second buffer;
a third FIFO, being coupled to the data diverting unit and the third buffer; and
said control buffer, being coupled to the first UART controller, the second UART controller, the third UART controller, the control endpoint, the memory and the GPIO unit.

14. The device of claim 13, wherein the data diverting unit comprises:
a first multiplexer, having a first input terminal, a second terminal and an output terminal;
a second multiplexer, also having a first input terminal, a second terminal and an output terminal;
a fourth buffer, being coupled between the first UART controller and the output terminal of the first multiplexer;

a fifth buffer, being coupled between the first UART controller and the first input terminal of the second multiplexer;
a sixth buffer, being coupled to the second UART controller;
a seventh buffer, being coupled between the second UART controller and the first input terminal of the first multiplexer;
an eighth buffer, being coupled to the third UART controller, and being also coupled to an interconnection node between the fifth buffer and the first input terminal of the second multiplexer;
a ninth buffer, being coupled between the third UART controller and the second input terminal of the second multiplexer;
a tenth buffer, being coupled to the second input terminal of the first multiplexer, and being also coupled to the second FIFO; and
an eleventh buffer, being coupled to the output terminal of the second multiplexer, and being also coupled to the third FIFO;
wherein the sixth buffer is also coupled to an interconnection node between the tenth buffer and the second input terminal of the first multiplexer.

15. The device of claim 1, wherein the host electronic device and the data monitoring electronic device are both one type of electronic device selected from a group consisting of laptop computer, desktop computer, all-in-one computer, industrial computer, and server computer.

16. A USB to UART converter, comprising a printed circuit board, a USB connector, a first UART connector, a second UART connector, a third UART connector, and a bridge device, wherein the USB connector, the first UART connector, the second UART connector, the third UART connector, and the bridge device are all disposed on the printed circuit board, and the bridge device being electrically connected to the USB connector, the first UART connector, the second UART connector, and the third UART connector;
wherein the bridge device comprises:
a USB unit, being coupled to the USB connector, so as to be in communication with a host electronic device through the USB connector;
a first UART controller, being coupled to the first UART connector, so as to be in communication with an electronic device through the first UART connector;
a second UART controller, being coupled to the second UART connector, so as to be in communication with a data monitoring electronic device through the second UART connector;
a third UART controller, being coupled to the third UART connector, so as to be in communication with the data monitoring electronic device through the third UART connector;
a control endpoint, being coupled to the USB unit;
an interface unit, being coupled to the USB unit;
a data buffer unit, being coupled to the interface unit;
a FIFO unit, being coupled to the data buffer unit, and having a control buffer coupled to the first UART controller, the second UART controller and the third UART controller; and
a data diverting unit, being coupled to the FIFO unit, the first UART controller, the second UART controller, and the third UART controller;
wherein in case of the electronic device transmitting a first serial data to the first UART controller through the first UART connector, the first UART controller receiving the first serial data by a first Baud rate, and then the data diverting unit transmits the first serial data to the third UART controller and the FIFO unit, such that the USB unit converts the first serial data to a first USB data after receiving the first serial data through the data buffer unit and the interface unit, thereby transmitting the first USB data to the host electronic device;

wherein after the host electronic device transmits a second USB data to the USB unit through the USB connector, the second USB data being subsequently transmitted to the FIFO unit via the interface unit and the data buffer unit, and then the data diverting unit transmits the second USB data to the first UART controller and the second UART controller after receiving the second USB data from the FIFO unit;

wherein the first UART controller converts the second USB data to a second serial data, so as to transmit the second serial data to the electronic device by said first Baud rate.

* * * * *